United States Patent
Thomas

(10) Patent No.: US 7,085,361 B2
(45) Date of Patent: Aug. 1, 2006

(54) METHODS AND SYSTEMS FOR COMMUNICATION FROM AN EXTERIOR OF A LOCATION

(75) Inventor: Robert P. Thomas, Cumming, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 27 days.

(21) Appl. No.: 10/739,835

(22) Filed: Dec. 18, 2003

(65) Prior Publication Data

US 2005/0135584 A1 Jun. 23, 2005

(51) Int. Cl.
*H04M 1/60* (2006.01)
*H04M 9/00* (2006.01)

(52) U.S. Cl. .......................... 379/167.01; 379/167.05; 379/167.11; 379/167.14

(58) Field of Classification Search ........... 379/167.01, 379/167.02, 167.03, 167.04, 167.05, 167.07, 379/167.08, 167.11, 167.12, 167.14, 67.1, 379/167.06, 156
See application file for complete search history.

(56) References Cited

U.S. PATENT DOCUMENTS

| | | | | |
|---|---|---|---|---|
| 4,715,060 A | * | 12/1987 | Lipscher et al. ............... 379/70 |
| 5,657,380 A | * | 8/1997 | Mozer ...................... 379/88.01 |
| 5,774,039 A | * | 6/1998 | Housley ...................... 340/326 |
| 5,905,787 A | * | 5/1999 | Stuart ...................... 379/167.05 |
| 5,966,432 A | * | 10/1999 | Buckler et al. ......... 379/167.05 |
| 6,049,598 A | * | 4/2000 | Peters et al. ............ 379/102.06 |
| 6,233,328 B1 | * | 5/2001 | Wolf ........................... 379/159 |
| 6,721,408 B1 | * | 4/2004 | Bain et al. ................... 379/159 |
| 2002/0129113 A1 | * | 9/2002 | Larsson ...................... 709/208 |
| 2004/0057567 A1 | * | 3/2004 | Lee ......................... 379/167.01 |
| 2004/0086093 A1 | * | 5/2004 | Schranz ....................... 379/37 |
| 2004/0229569 A1 | * | 11/2004 | Franz ......................... 455/66.1 |
| 2005/0125083 A1 | * | 6/2005 | Kiko ........................... 700/19 |
| 2006/0078102 A1 | * | 4/2006 | Giannakouros ........ 379/167.05 |

* cited by examiner

*Primary Examiner*—Binh K. Tieu
(74) *Attorney, Agent, or Firm*—Cantor Colburn LLP

(57) ABSTRACT

Methods and systems for allowing communication between an exterior and an interior of a location, or a person associated with the location. A device positioned exterior to the location is connected to a communications system of the location. The device includes a signal generator for providing a signal responsive to input such as from a person on the exterior. In response, the communications system initiates or forwards a communication to a communications unit such as a wireless unit of a person associated with the location. The communication may be initiated or forwarded after a selected time. The device exterior to the location allows for participation in the communication. A voicemail or other system may be included for receiving a message if the communication is not answered. The device may be switchable to doorbell mode, in which case, the device does not generate the signal to the communications system and no communication is initiated or forwarded.

19 Claims, 4 Drawing Sheets

METHODS AND SYSTEMS FOR COMMUNICATION FROM AN EXTERIOR OF A LOCATION

FIELD OF THE INVENTIONS

The inventions relate to communications, and particularly, relate to communication between a person exterior to a location, and a person interior to the location or associated with the interior of the location.

BACKGROUND

Receptionists are employed by many firms and companies to welcome visitors, accept deliveries, and generally attend the entranceways of these firms and companies. Many small businesses and most homes do not have the means to employ someone to just "watch the door". Yet, the lack can cause problems for those without receptionists and doormen. Moreover, firms that have receptionists and homes or complexes with doormen may experience similar problems when the receptionists or doormen are not in attendance at their posts.

A very common device used as a substitute for a receptionist or a doorman is a doorbell. A home or business may keep its entrance locked to keep out unwanted or surprise visitors. A person may gain entry by ringing the doorbell and waiting for someone to open the door. Use of the doorbell alerts those behind the locked door to the presence of someone at the entrance.

Some places like apartment complexes have an added feature of an intercom for use in gaining entry. A visitor may ring a buzzer for the person he or she desires to visit. The person may speak to the visitor and the visitor may reply over the intercom. If the person decides to let the visitor in, the person may provide a signal that unlocks the entrance to the complex, and the visitor enters.

At times, a doorbell and even a doorbell with an intercom is a poor substitute for a receptionist or doorman. One of these times arises when a delivery is to be made to a location, but nobody answers the doorbell or responds to the intercom. It would be helpful for the delivery person to be able to communicate with the recipient, even if the recipient is not at the location, to obtain the recipient's preference with respect to the delivery. For example, a florist may arrive at a home with a bouquet of fresh flowers, but no one answers the door. The flowers may have to be left on the doorstep where they may be exposed to the elements, left with neighbors, or taken back to the flower shop. It would be helpful if the florist could speak to the recipient about the delivery. The recipient may be home shortly, or have a preference for delivery options. The same problem may be faced by other delivery personnel. If there was a way for the florist or other delivery personnel to easily check with the recipient, the florist or other delivery personnel could handle the flowers or other deliveries in the way the recipient chooses.

Another time the lack of a "doorwatcher" may be a detriment arises when a friend, family member, neighbor or other person stops by, but nobody comes to the door. The visitor may desire to leave a message to give notice that he or she had stopped by. But the doorbell does not allow for any such message delivery, and neither does the intercom unless it has a voicemail function. If the visitor happens to have paper and pen or pencil, the visitor may leave a note. Even if the visitor leaves the note, it may blow away, become illegible due to the elements, may be overlooked, or otherwise fail in its purpose.

Another case where a person may desire to leave a message may come about when a visitor arrives expecting to be met by somebody at the location. For example, a homeowner may have scheduled a service call at a certain time. The service provider arrives at the home, but nobody meets him or her. It would be desirable for the service provider to be able to talk to the homeowner directly to clarify any misunderstanding about meeting times. If the service provider cannot speak directly to the homeowner, the service provider may like to leave a message. The service provider may desire to leave a message to prove he or she had arrived at the appointed time and place. Further, the service provider may desire to leave an informative message such as that he or she will return in an hour, or other message. It would be helpful for the service provider to be able to communicate with the homeowner by leaving a message to set up another time for meeting, to check if the homeowner is running late, etc.

As another example, a person may have agreed to meet a friend at the friend's apartment to travel together to a restaurant. But when the person arrives, nobody answers the doorbell or responds to the intercom. The person probably would like to speak directly with the friend to check on the meeting arrangements. If the person cannot speak directly to the friend, the person may desire to leave a message that he or she has gone to the restaurant. As noted with the visitor who stops by, a doorbell and an intercom (without a voicemail function) do not allow for messages to be left for the occupants of the location. It would be helpful if the person could communicate with the friend by leaving a message, even if the friend is not at home. In this situation, the person may desire to check with the friend to see if the friend has gone to the restaurant, has forgotten the appointment, is running late, etc. Neither the doorbell nor the intercom allows a visitor to check with a person if the person fails to answer the doorbell or the intercom.

The failings of doorbells and intercoms as substitutes for a receptionist or doorman may be problematic as well for the people associated with the location that lacks a receptionist or a doorman. The people associated with the location do not receive information from the doorbell or the intercom (without voice mail function). From the doorbell or intercom (without voicemail function), the people at the location do not know if anybody stopped by or arrived for an appointment or otherwise.

Another problem with a doorbell or an intercom is that it may malfunction or may not be heard, and therefore fail to alert the people inside the location that someone has arrived.

As noted, a problem with doorbells is they generally do not allow for the exchange of information between somebody on the inside of the location and somebody on the outside. Before opening an entrance to a visitor, a person inside the location may desire to know the identity of the visitor and/or the visitor's purpose. The person inside may desire this information for security, privacy, or other reasons such as a desire to not be interrupted from current activity by just any visitor. This information cannot be gained unless the doorbell is upgraded at least to include an intercom function. Such functionality may be cost prohibitive. Such functionality may be impossible to implement in some entrances. Further, such functionality may not accomplish the desire of the person associated with the location to screen his or her visitors without the visitors knowing of such screening. With an intercom, the person inside the location may have to talk to the person outside the door, and by such communication, reveal he or she is at home. If the person inside the location turns away the visitor after determining his or her identity or purpose, the visitor may be offended by the person's action. For screening purposes, it is generally preferable the persons being screened are unaware of such screening.

On the other hand, an unanswered doorbell or intercom is considered by some people to pose a security risk. The person ringing the doorbell or using the intercom may conclude from the failure to answer that nobody is home or nobody is present at the location. This information may serve as incentive for the unlawful entry onto the premises for burglary, or other reasons.

Accordingly, there is a need for a way of information exchange between a person arriving at a location where no one answers the door or responds to an intercom and a person associated with the location. There is also a need for a way for a person arriving at a location, who encounters an unanswered doorbell or intercom, to leave a message for a person associated with the location. There is a need for the message to be left so it does not fail in its purpose such as by being blown away, by being made illegible by the elements, or by being overlooked. In addition, there also is a need for a way for an occupant of a location to be able to screen his or her visitors, and preferably, without giving away the occupant is present in the location. Further, there is a need in some cases for a way for a person associated with a location, but not located inside the location, to be able to respond to a visitor who arrives at the entrance of the location by giving the visitor the impression the location is occupied.

SUMMARY

The inventions relate to methods and systems for allowing a person located exterior to a location to communicate with someone in the interior of the location, or otherwise associated with the location. Advantageously, the inventions allow the person exterior to the location to contact the person inside the location or associated with it. If the person cannot be reached, then the person outside the location may leave a message such as a voicemail message. The inventions also may allow the person inside the location or associated with it to screen visitors without letting the visitors know of such screening. In addition, the inventions may allow the person associated with the location to give the impression to visitors the location is occupied even if it is not occupied at the time of the visit.

The inventions include an exemplary system for allowing a person exterior to a location to communicate with a person associated with the location. The person associated with the location may or may not be inside the location. The exemplary system includes a communications system associated with the location and connected to the public switched telephone network (PSTN), or other network(s) or system(s) for communications. A device is positioned exterior or on the exterior of the location and is connected to the communications system. The device may include a doorbell or similar unit.

The device positioned exterior to the location includes a signal generator for generating a signal to the communications system in response to input from the person exterior to the location. For example, the signal generator may be responsive to the doorbell part of the device being pushed by the person exterior to the location. Responsive to the signal from the signal generator of the device, the communications system initiates a communication to the person associated with the location. For example, the communication may be a call directed to a communications unit (such as a wireless or wireline unit) of the person associated with the location. The device allows the person exterior to the location to participate in the communication.

The exemplary system may include a voicemail or other message system connected to the communications system for receiving a message from the person exterior to the location if the person associated with the location fails to answer the communication.

An advantage of the exemplary system is the device located exterior to the location may be switchable to doorbell mode. When the device is in the doorbell mode, the device fails to generate the signal to the communications system, and therefore no communication is initiated to the person associated with the location. For example, the device in doorbell mode may simply function as a doorbell.

The inventions also include an exemplary method for allowing a person exterior to a location to communicate with a person associated with the location. In the exemplary method, a signal is received from a device exterior to the location. In response to the signal, a communication from the location is initiated to a number corresponding to a device of the person associated with the location. The device exterior to the location is connected to the communication and allows the person exterior to the location to participate in the communication. The exemplary method may provide that the device is switchable to a doorbell mode. If the device is in doorbell mode, as an example, the device may function simply as a doorbell. The exemplary method may provide a voicemail system or other messaging system for receiving a message from the person exterior to the location when the person associated with the location fails to answer the communication.

The inventions include another exemplary method that, in response to receiving a signal initiated exterior to a location, originates a communication from the location. An optional feature of this exemplary method is the communication may be routed only after a selected time has passed since the signal or after the signal has been received. The option gives a person associated with the location some time to respond to the signal prior to the communication being initiated. The communication is routed to an identifier associated with the location. The identifier may be a number for a wireless unit. A device exterior to the location is connected to the communication. If the communication is answered, the device exterior to the location is connected in a communicable relationship with a unit corresponding to the identifier associated with the location. If the communication is not answered, it may be routed to a messaging service. This exemplary method also may provide for the device exterior to the location to be switchable to doorbell mode.

Advantageously, the inventions address the needs described above by providing exemplary methods and systems to allow for communication between a person exterior to a location and a person interior to the location or associated with it. If the person exterior to the location is unable to communicate directly with the person associated with the location, the person exterior to the location may leave a message such as a voicemail message. The person inside the location or associated with it may have the options of answering the communication from the person outside the location, screening the communication, or letting the communication be transferred to a voicemail or other messaging service. Other features and advantages of the inventions are provided below.

DETAILED DESCRIPTION

Figure 1:
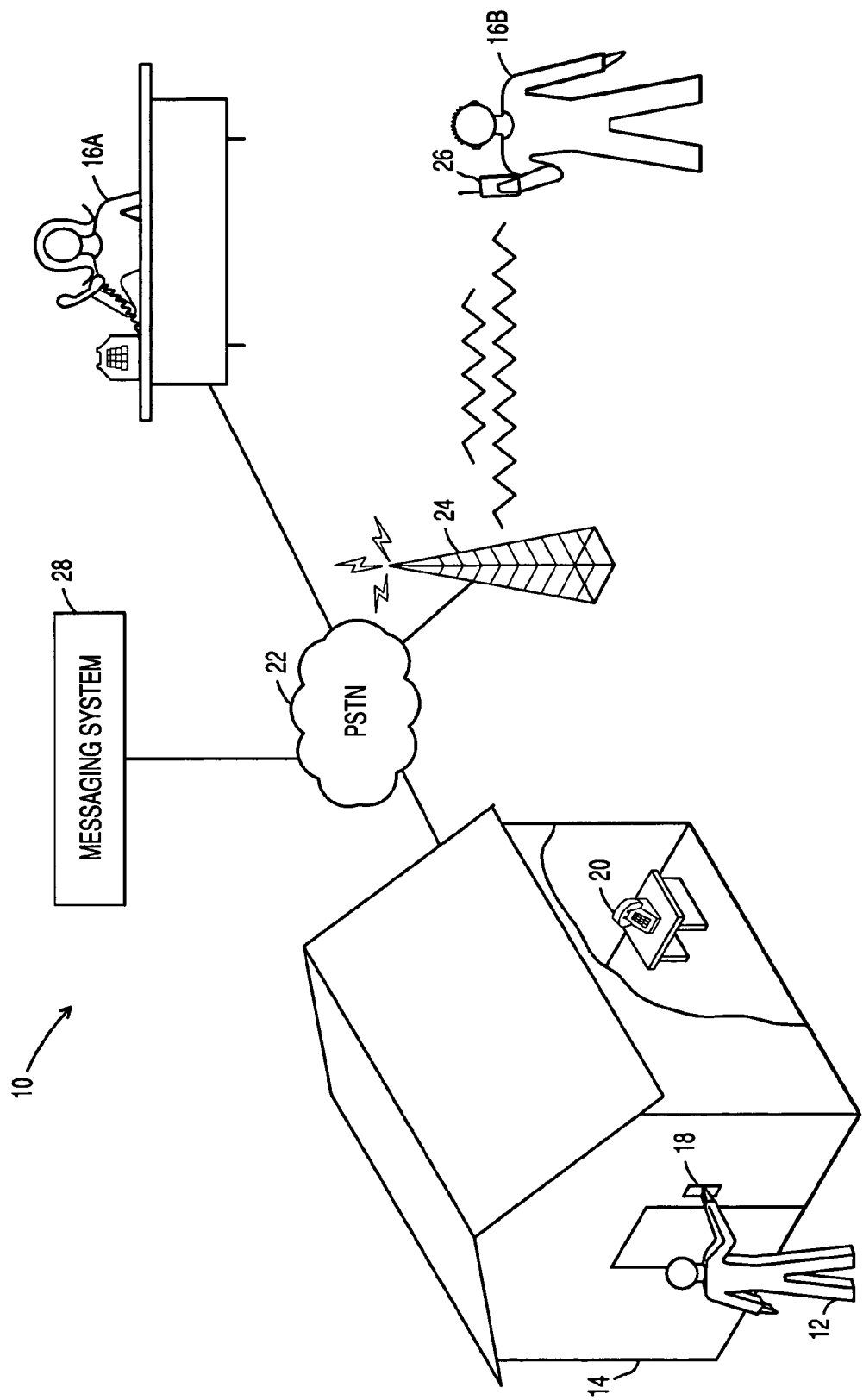
FIG. 1 illustrates an exemplary environment for implementation of the exemplary embodiments of the inventions.
Figure 2:
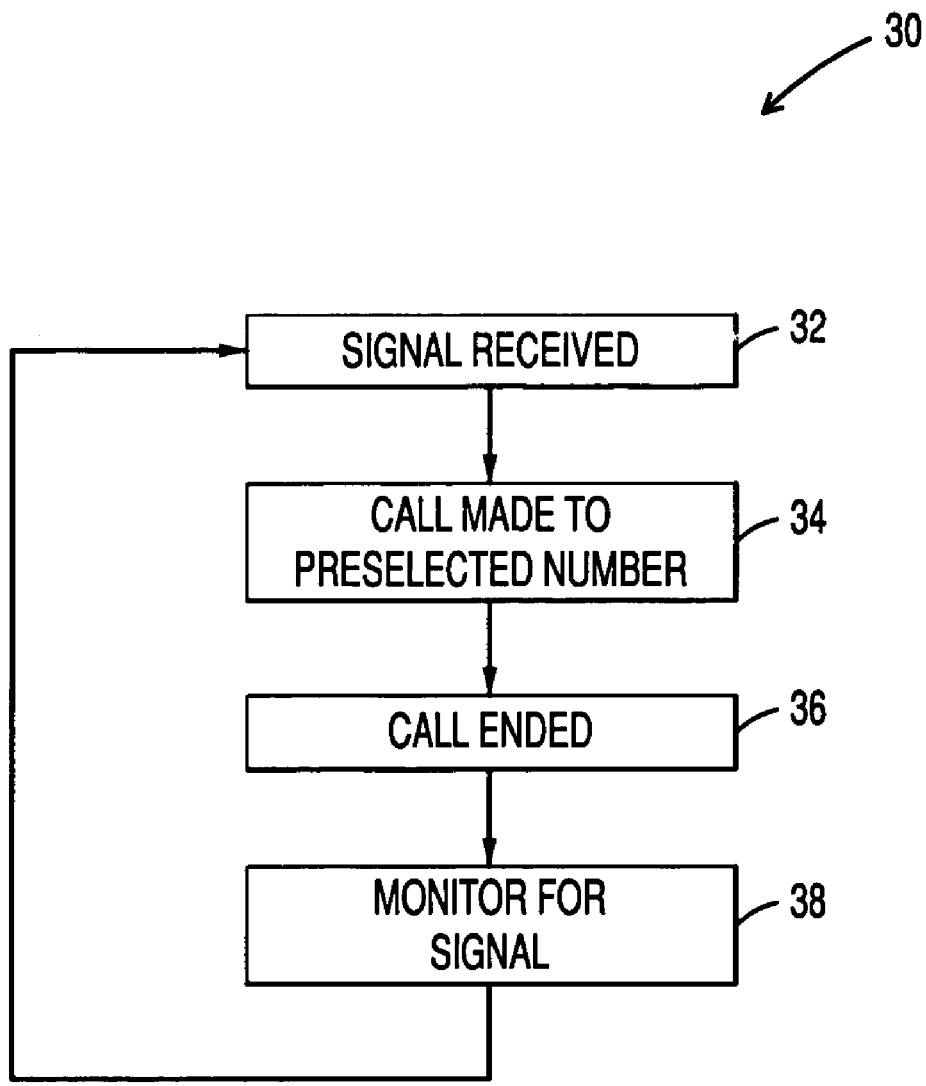
FIG. 2 illustrates an exemplary process of an exemplary embodiment of the inventions.

An Exemplary Embodiment—FIGS. 1–2

FIG. 1 illustrates an exemplary environment 10 including an example of a possible implementation of the inventions. The person 12 arriving at the location 14 activates a device 18, described in more detail below. In this example, the device 18 is connected to the communications system (not illustrated except for a representative telephone 20) of the location 14.

In response to the activation of the device 18, a signal is generated by a signal generator (not illustrated) of the device 18 and provided to the communications system. In response to the signal, the communications system initiates a communication over the public switched telephone network (PSTN) 22 (or otherwise—not illustrated) to the person 16A, 16B associated with the location 14. The communication may be a wireline call as illustrated in FIG. 1 over PSTN 22 to the person 16A associated with the location 14. Alternatively, the communication may be a wireless call over the PSTN 22 and wireless network 24 (represented by the antenna in FIG. 1) to the wireless unit 26 of the person 16B associated with the location 14. The communication also may be an electronic message (e-mail) and may be transmitted over the PSTN 22 and/or one or more data networks. Even though FIG. 1 illustrates the PSTN 22 and wireless network 24 as the networks for carrying communications, the inventions are not so limited. Instead or in addition to the PSTN 22 and/or wireless network 24, other network(s) or system(s) with appropriate functionality may be used to carry the communication.

The device 18, being connected to the communications system of the location 14, allows the person 12 exterior to the location 14 to communicate with the person 16A, 16B associated with the location.

The device 18 activated by the person 12 exterior to the location 14 is also located exterior to the location 14, and may be located on the exterior of the location 14 such as illustrated in FIG. 1. The device may appear to be and/or include a doorbell including a pushbutton or other mechanism as or as part of the signal generator for providing the signal that initiates the communication to the person 16A, 16B associated with the location 14. The device 18 may provide the ringing of a doorbell on the interior of the location 14 so the person exterior to the location 14 has the impression the device 18 is a doorbell.

As noted above, in this example, the device 18 is connected to the communications system of the location 14. The connection may be a wireline connection (not illustrated) or a wireless connection (not illustrated). The connection between the device 18 and the communications system of the location 14 need not be made at nor within the location 14. For example, the connection may be made exterior to the location 14 by a connection to the equipment providing telecommunications service to the communication system of the location 14. As another example, the connection may be made exterior to the location 14 by an association between the device 18 and the communications system of the location 14 such as an association made in the central office (CO) providing the telecommunications service to the communication system of the location 14.

In this example, the device 18 includes functionality to allow the person 12 exterior to the location 14 to participate in the communication to the person 16A, 16B associated with the location 14. To allow such participation, the device 18 may include features such as found on a telephone, wireless unit, an intercom, walkie-talkie, a computer, or the like. For example, the person 12 exterior to the location 14 may be able to speak to and hear the person 16A, 16B over the communication such as in a telephone call. As an alternative, (or in addition), the device 18 may include a keyboard or similar mechanism for receiving input from the person 12 exterior to the location 14, and/or may include a display for presenting text information from the person 16A, 16B associated with the location 14.

Also as stated above, in this exemplary embodiment of the inventions, the signal from the device 18 to the communications system of the location 14 initiates or originates a communication to a person 16A, 16B associated with the location 16B. FIG. 1 illustrates a telephone 20 as representative of the communications system of the location 14, which may be or may include the telephone system of the location. But the communications system should not be so limited. The communications system may be or may include a wireless system, a computer system, data network, or other communications element or network. The communication initiated by the communications system may be a telephone call (also referred to as a wireline call), but does not necessarily have to be such a call. The communication may be a wireless call, a page, an electronic message (for example: e-mail), or the like as may be selected by the person associated with the location 14. The exemplary environment 10 of FIG. 1 may be modified by the inclusion and/or substitution of one or more data networks, or other systems and networks to carry the communication from the location 14 to the person associated with the location 16A, 16B.

FIG. 2 illustrates exemplary actions 30 as may be carried out by the communications system of the location 14. In action 32, a signal is received such as the signal from the signal generator from the device 18. A communication such as a call is made in action 34 to an identifier such as a preselected number, e-mail address, etc. Once the call is at an end as noted in action 36, the communications system of the location 14 monitors for receipt of the signal in action 38, and the actions may repeat themselves thereafter in response to receipt of a signal.

The exemplary embodiment may include a time delay feature so as to allow a person within the location 14 to respond to the signal from the device 18 prior to the communication being initiated to the person 16A, 16B associated with the location 14. For example, referring to FIG. 2, after action 32 of receiving the signal, the exemplary embodiment may allow a preselected time to pass prior to action 34 of calling the preselected number. During the preselected time, a person in the location 14 may answer the door, thereby obviating the necessity of a communication to the person 16A, 16B associated with the location 14. The device 18 may be configured to sense the door has been opened or some other event has taken place to abort the initiation of the communication to the person 16A, 16B associated with the location 14. Alternatively (and/or in addition), the person who answers the door may be able cancel the initiation of the communication by providing cancellation input to the device 18 or otherwise.

An advantage of the exemplary embodiment of the inventions described above is that it may allow the person 12 exterior to the location 14 to leave a message if the person 16A, 16B associated with the location 14 fails to answer or respond to the communication. As illustrated in FIG. 1, the exemplary embodiment may include, may be connected to, and/or may have access to a messaging system 28 such as a network voicemail system. If the communication to the person 16A, 16B associated with the location is a call, then upon failure of the person 16A, 16B to answer, the call may rollover to the messaging system 28. The person 12 exterior to the location 14 may leave a message such as a voicemail message. The person 16A, 16B may be able to retrieve the message from the messaging system by making a call to the messaging system or otherwise.

The exemplary embodiment may include an "on/off" feature for implementation as selected by the person 16A, 16B associated with the location 14. For example, the device 18 may include a "doorbell" mode. If the device 18 is set to the doorbell mode, the device 18 only functions as a doorbell. The person 16A, 16B associated with the location 14 may switch the device 18 on and off (i.e., back and forth between the doorbell mode and the messaging mode) manually by a switch or other feature on the device 18. Alternatively, (or in addition), the person 16A, 16B may be able to switch the device back and forth by a call or other communication from the location 14 or from locations other than the location 14. For example, the person 16A, 16B associated with the location may call a "management number" and respond by voice commands or keypad input to options available regarding the device 18. These options may include the turning on and off of the device 18. As another example, the person 16A, 16B may be able to turn the device on and off by sending an e-mail message to a service center.

Figure 3:
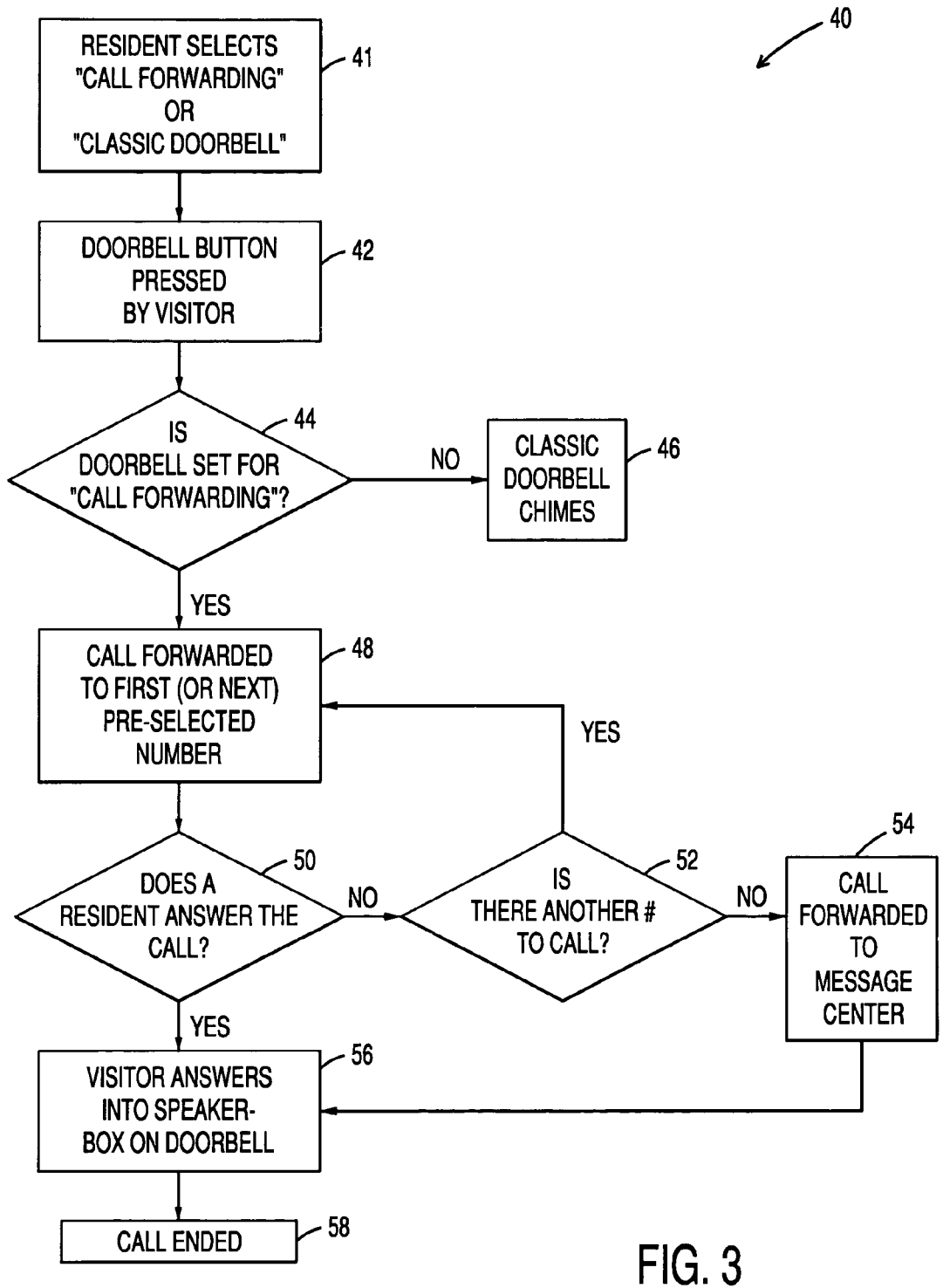
FIG. 3 is a flow diagram illustrating an exemplary embodiment of the inventions.

Call Forwarding Exemplary Embodiment—FIG. 3

In contrast to the exemplary embodiment described above wherein the communications system of the location 14 initiates a communication to a person 16A, 16B associated with the location 14, in another exemplary embodiment (referred to as the "call forwarding embodiment"), the device 18 initiates a communication with the communications system of the location 14, and that communication is forwarded to the person 16A, 16B associated with the location 14.

More particularly, in the call forwarding embodiment, in response to input from a person 12 exterior to the location 14, the device 18 may initiate a communication to the communications system of the location 14. For example, the device 18 may call the telephone number of the telephone 20 in the location 14. The communication then may be forwarded to another destination as selected by a person 16A, 16B associated with the location 14. Preferably, only communications initiated by the device 18 to the communications system of the location 14 are forwarded. As an example, calls made from origins other than from the device 18 are not forwarded. The selective call forwarding of this exemplary embodiment may be implemented through a termination attempt trigger (TAT) set with respect to the telephone number of the location 14 and an identifier of the device 18 in the central office (CO) of the PSTN 22 serving the location 14. Other features and functions as described above in connection with the exemplary embodiment of FIGS. 1–2 may be included with the call forwarding embodiment.

As an example, the exemplary embodiment described in connection with FIG. 3 also may include a switchable "doorbell mode", which may be referred to as "classic doorbell". The device 18 functions only as a doorbell when the device 18 is set in the "classic doorbell" mode.

FIG. 3 illustrates exemplary actions 40 of the call forwarding embodiment. In action 41, the person 16A, 16B associated with the location 14 (also referred as the "resident") may set the embodiment into the "classic doorbell" mode or the "call forwarding" mode. In action 42, a visitor (also referred to as a "person exterior to the location") may provide input to the device 18 such as by pressing the doorbell button. If the check in action 44 of whether the embodiment (also referred to as "doorbell" for this flow diagram) is set for "call forwarding" results in a negative, then in action 46 the doorbell chimes (or otherwise provides notice). If the check in action 44 results in a positive, then the communication is forwarded to an identifier such as a pre-selected number in action 48.

The call forwarding embodiment may provide more than one identifier for forwarding of the communication. For example, a resident of the location 14 may provide two numbers: a wireline number; and a wireless number. The identifiers may be organized in a hierarchy in order of precedence with respect to the call forwarding feature. In the example, in action 48 the communication is forwarded to the first identifier, which is identified as a pre-selected number.

After the communication is forwarded, in action 50, a check is carried out to determine whether the forwarded communication has been answered. If the result is negative, then in action 52 a check is carried out to determine whether another identifier such as a telephone number has been provided by the resident for forwarding of the communication. If the result of the check in action 52 is positive (i.e., another identifier has been provided), then the process returns to action 48 in forwarding the communication to the next identifier such as the next pre-selected number. If the result of the check in action 52 is negative (no other identifier has been provided), then in action 54 the communication may be forwarded to a message center such as a voicemail system, or other default action may be taken. In action 56, the visitor may communicate so as to leave a message in the message center by speaking into the speaker box of the doorbell (or otherwise), and the process ends in action 58.

Referring again to action 50 wherein a check is carried out to determine whether the resident answered the "call forwarded" communication, the result may be positive. If so, then in action 56 the visitor may communicate with the resident by using the speaker-box of the doorbell (or otherwise), and the process ends in action 58.

Figure 4:
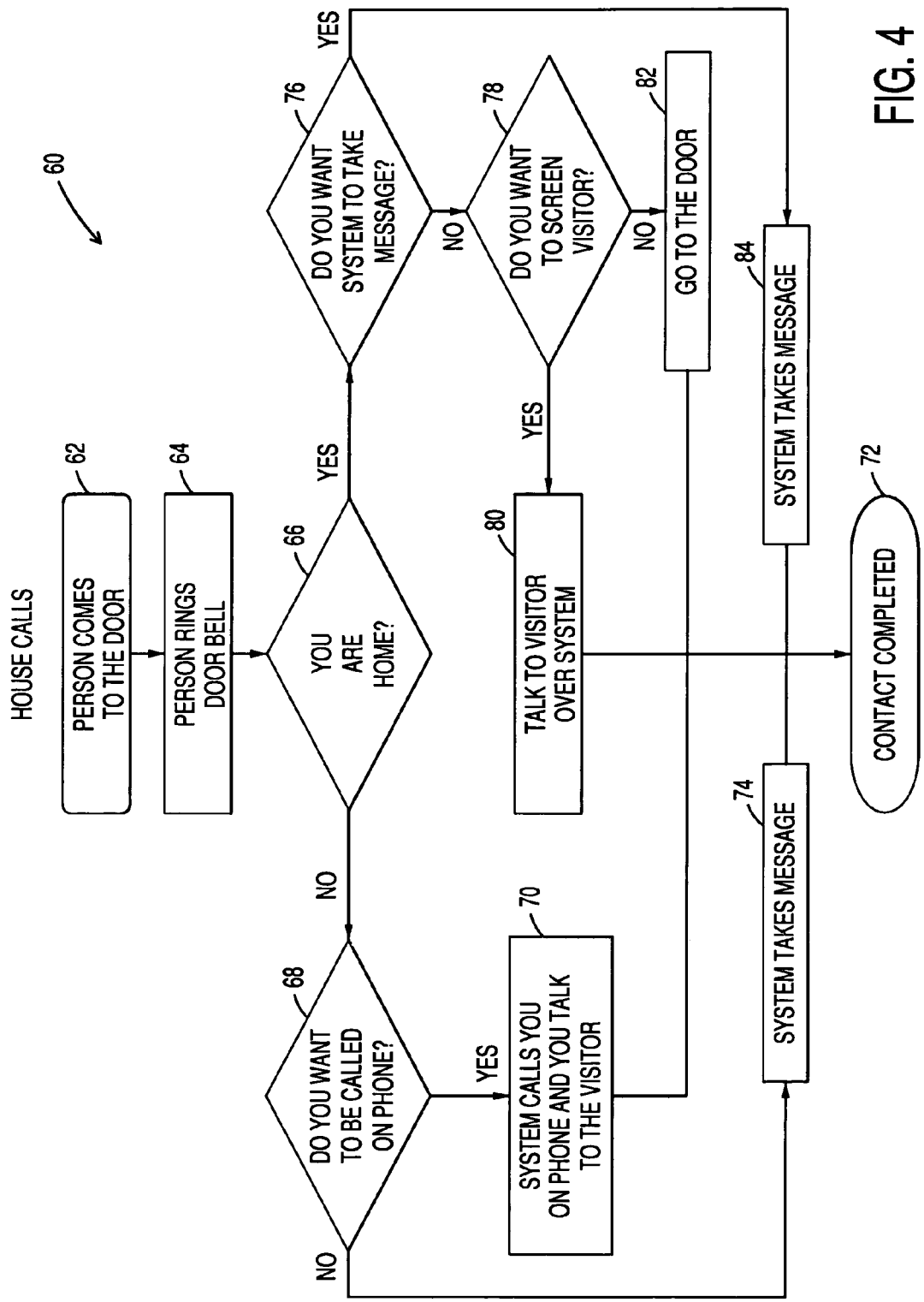
FIG. 4 is a flow diagram also illustrating an exemplary embodiment of the inventions.

Exemplary Embodiment of the Resident's Perspective—FIG. 4

FIG. 4 illustrates options and advantages of an exemplary embodiment of the inventions in a flow diagram from a user's or resident's perspective. The user or resident refers to a person associated with a location including an exemplary embodiment.

In action 62, a person comes to the door of the location (also referred to as "home") and in action 64 provides input to the device 18, which is referred to as a "doorbell" or "door bell" for this exemplary embodiment. If the resident is not at home as determined in action 66, a determination is made in action 68 as to whether the resident desires to be contacted such as by being called on the telephone or otherwise. If the response is positive, then the exemplary embodiment calls or otherwise communicates with the resident. If the resident answers or responds, then the resident and the visitor may communicate, and the process ends in the contact completed action 72. If the determination in action 68 is the resident does not want to be communicated with, then in action 74 the exemplary embodiment takes a message and the process ends in the contact completed action 72.

Referring again to action 66 wherein a determination is made as to whether the resident is at home, if the result is positive, then in action 76 a determination is carried out as to whether the resident desires the exemplary embodiment to take a message. If the result is positive, then in action 84 the exemplary embodiment takes a message, and the process ends in the contact completed action 72. On the other hand, if the determination in action 76 is the resident desires no message be taken with respect to the visitor, then in action 78 a check is carried out to determine whether the resident desires to screen the visitor. If the result is positive, then in action 80 the resident may talk to (or otherwise screen) the visitor, and the process ends in the contact completed action 72. If the resident does not desire to screen the visitor as determined by action 78, then the resident may go to the door in action 82, and the process ends in the contact completed action 72.

CONCLUSION

From the foregoing description of the exemplary embodiments of the inventions and operation thereof, other embodiments will suggest themselves to those skilled in the art. Therefore, the scope of the inventions is to be limited only by the claims below and equivalents thereof.

I claim:

1. A doorbell system for allowing a person exterior to a location to communicate with a person associated with the location, comprising:
    a communications system associated with the location and connected to the public switched telephone network (PSTN);
    a device positioned exterior to the location and connected to the communications system of the location,
    the device positioned exterior to the location including a signal generator for generating a signal to the communications system in response to input from the person exterior to the location;
    responsive to the signal from the signal generator of the device, initiating a time delay,
    upon expiration of the time delay without receiving a cancellation input, the communications system operative to initiate a communication to a person associated with the location, the initiating of the communication initiating communication via a public switched telephone network or a wireless communication network; and
    the device positioned exterior to the location operative to allow the person exterior to the location to participate in the communication;
    wherein the device senses an entrance to the location being opened and the communication system cancels the initiation of communication over the public switched telephone network or a wireless communication network to a person associated with the location.

2. The system of claim 1, wherein the device senses a door being opened and the communication system cancels the initiation of communication to a person associated with the location.

3. The system of claim 1, further comprising:
    a voicemail system connected to the communications system for receiving a message from the person exterior to the location if the person associated with the location fails to answer the communication.

4. The system of claim 1, wherein the communications system is operative to initiate the communication to a communications unit of the person associated with the location.

5. The system of claim 4, wherein the communications unit of the person associated with the location comprises a wireless unit.

6. The system of claim 4, wherein the communications unit of the person associated with the interior of the location comprises a wireline unit.

7. The system of claim 1, wherein the communication comprises a call.

8. The system of claim 1, wherein the person associated with the location is not located within the location.

9. The system of claim 1, wherein the communications system inside the location comprises a wireline system.

10. The system of claim 1, wherein the communications system inside the location comprises a computer connected to the PSTN.

11. The system of claim 1, wherein the device comprises a device switchable to a doorbell mode; and
    wherein the device in the doorbell mode fails to generate the signal to the communications system.

12. A method for operating a doorbell for allowing a person exterior to a location to communicate with a person associated with the location, comprising:
    receiving a signal from a device exterior to the location;
    in response to the signal, initiating a time delay;
    upon expiration of the time delay without receiving a cancellation input, causing a communication from the location to be initiated to a number corresponding to the location, the initiating of the communication initiating communication via a public switched telephone network or a wireless communication network;
    causing the communication to be forwarded to a device of the person associated with the location; and
    causing the device exterior to the location to be connected to the communication and to allow the person exterior to the location to participate in the communication;
    canceling the communication via a public switched telephone network or a wireless communication network to a person associated with the location upon sensing an entrance associated with the location being opened.

13. The method of claim 12, wherein the device is switchable to a doorbell mode; and further comprising:
    causing no communication to be initiated when the device is in the doorbell mode.

14. The method of claim 12, further comprising:
    providing a messaging system for receiving a message from the person exterior to the location when the person associated with the location fails to answer the communication.

15. The method of claim 12, wherein the communication is initiated from the location to the number corresponding to the location only after a selected time since the signal.

16. A method for operating a door bell for establishing communication, comprising:
    receiving a signal initiated exterior to a location;

responsive to the signal, causing a communication to be originated from the location and routed to an identifier associated with the location the communication being performed via public switched telephone network or a wireless communication, network; and causing a unit exterior of the location to be connected to the communication, wherein the communication is originated from the location only after a selected time has passed since the signal;

canceling the communication over the public switched telephone network or a wireless communication network to a person associated with the location upon sensing a an entrance associated with the location being opened.

17. The method of claim 16, further comprising:
in response to the communication failing to be answered, routing the communication to a messaging service of the identifier associated with the location.

18. The method of claim 16, wherein the unit is switchable to a doorbell mode; and further comprising:
causing no communication to be originated when the unit is in the doorbell mode.

19. The method of claim 16, wherein the identifier comprises a number for a wireless unit; and
wherein the communication is routed to the number for the wireless unit.

* * * * *